United States Patent [19]
Loderer

[11] 3,896,348
[45] July 22, 1975

[54] CIRCUIT FOR SUPPLYING A DC LOAD FROM AN AC SOURCE THROUGH A RECTIFIER

[75] Inventor: Peter Loderer, Erlangen, Germany

[73] Assignee: Siemens Aktiengesellschaft, Munich, Germany

[22] Filed: July 2, 1974

[21] Appl. No.: 485,088

[30] Foreign Application Priority Data
July 2, 1973   Germany............................. 2333570

[52] U.S. Cl. .................. 318/227; 318/138; 321/10; 321/19; 323/102
[51] Int. Cl........................ H02p 13/16; H02m 1/12
[58] Field of Search ...................... 321/4, 10, 18, 19; 318/227, 246, 341, 138, 344, 345; 323/102, 119, 128, 121, 122

[56] References Cited
UNITED STATES PATENTS

| | | | |
|---|---|---|---|
| 3,191,112 | 6/1965 | Cain...................................... | 321/18 |
| 3,400,326 | 9/1968 | Zhukou et al. ...................... | 323/128 |
| 3,691,439 | 9/1972 | Jensen et al. .......................... | 321/10 |
| 3,833,848 | 9/1974 | Petersen .............................. | 321/19 |

FOREIGN PATENTS OR APPLICATIONS

| | | | |
|---|---|---|---|
| 1,153,450 | 8/1963 | Germany ............................ | 318/345 |
| 292,405 | 7/1965 | Netherlands........................... | 321/19 |

Primary Examiner—William H. Beha, Jr.
Attorney, Agent, or Firm—Kenyon & Kenyon Reilly Carr & Chapin

[57] ABSTRACT

An improvement A.C. a circuit for supplying a D.C. load from an A.C. source through an uncontrolled rectifier with a control element arranged between the output of the rectifier and D.C. load using a control unit synchronized with the A.D. source to keep the power factor at a predetermined value and the circuit including a capacitor associated with the DC control element and a by-pass diode bridged across the DC load in which, in order to suppress harmonics to the greatest degree possible, the DC load is bridged by two by-pass diodes connected in series in the same direction and the capacitor associated with the DC control element is connected between one input terminal and the center connection point of the two by-pass diodes. In a second variation, the same result is achieved with the capacitor and a first decoupling diode connected in series between the input terminals of the DC control element with one electrode of the capacitor connected with one input terminal of the DC control element and the other electrode of the capacitor through a second decoupling diode to an output terminal of the DC control element.

12 Claims, 6 Drawing Figures

CIRCUIT FOR SUPPLYING A DC LOAD FROM AN AC SOURCE THROUGH A RECTIFIER

BACKGROUND OF THE INVENTION

This invention relates to circuits for supplying a DC load from an AC source through an uncontrolled rectifier and a control element in general, and more particularly, to an improved circuit of this nature which reduced harmonics.

Circuits are known in which an AC source is used to supply a DC load with the AC source being recitified by an uncontrolled rectifier and the rectified voltage then provided through a control element to the DC load. The control element includes a control unit synchronized with the AC source such as to keep the power factor at a predetermined value, normally approximately at one. Typically associated with a circuit of this nature is a capacitor across the DC control element and a by-pass diode bridged across the DC load. A circuit of this nature is disclosed in the journal *Electrie* volume 25, pages 282–284, FIG. 2. The capacitor is coupled directly between the input terminals of the DC control element and, thus, between the output terminals of the uncontrolled rectifier. This results in a distinct disadvantage since the capacitor forms a resonant circuit with the inductance at the input of the circuit arrangement, particularly with the inductance of the AC source, in which large currents can flow, particularly if the DC control element is pulse controlled. These currents, which in the case of a capacitor of fixed value cannot be influenced or controlled externally have a reactive effect on the AC source. The currents contain harmonics at a frequency generally above that of the AC system unless the capacitor is made to be unreasonably large. Clearly, these harmonics can have a disturbing effect on other loads connected to the AC source and act as an additional load on that source. Harmonic currents are present particularly in the case of a single-phase AC source in a single-phase AC rectifier.

In view of this, it is clear there is a need for an improved circuit of the type referred to at the outset which can reduce harmonic currents as much as possible. Such a circuit is particularly needed for use where a single-phase AC source and single-phase rectifier bridge are used to supply a DC load.

SUMMARY OF THE INVENTION

The present invention provides a solution to this problem. According to a first embodiment of the invention the problem is solved by the use of two by-pass diodes connected in series bridging the DC load. The capacitor associated with the DC control element is connected between one input terminal of that element and the center of the two by-pass diodes.

According to a second embodiment of the invention the problem is solved by having a capacitor and decoupling diode connected in series between the input terminals of the DC control element with one electrode of the capacitor connected with one input terminal of the DC control element and the other diode with an output terminal of the DC control element.

The first embodiment requires two-high capacity by-pass diodes each of which must be capable of carrying the full load of current. The second embodiment requires only one-high capacity by-pass diode. The two decoupling diodes are stressed to a considerably smaller degree and thus can be made smaller. Selection between which of the circuits is most appropriate can be made in each individual case depending on cost and space requirements. In both embodiments, the harmonic currents are suppressed and their detrimental reaction on the AC source eliminated. The advantages of the present invention are particularly significant where the uncontrolled rectifier of the circuit is a single-phase rectifier bridge. In an illustrated embodiment of the invention a current regulator associated with the control unit for the DC control element has as inputs a voltage proportional to the load current used as an actual value and a reference value input to which this is compared. The current regulator using these inputs determines the pulsewidth of the current supplied to the load. In accordance with a further feature of the present invention, there can be associated with the control unit for the DC control element a power factor control having as inputs the actual value of the power factor of the AC source and an appropriate reference value. This power factor control determines the instance of firing of the DC control element. Depending on the specific application, the power factor can either be optimized using this control i.e., cosine made equal to 1, or any desired value of an inductive or capacitive power factor can be preset. The circuit of the present invention is used to particular advantage for supplying an electric motor through an inverter with the electric motor constituting the DC load.

DETAILED DESCRIPTION OF THE PREFERRED EMBODIMENT

Figure 1:
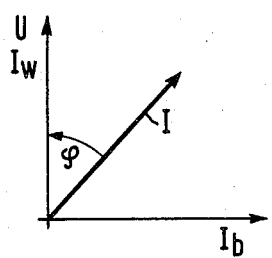
FIG. 1 is a vector diagram illustrating the relationship between current and voltage which defines the power factor.

FIG. 1 is a vector diagram illustrating the relationship between voltage current and power factor. On the diagram the abscissa shows the reactive current $I_b$ and the ordinate the active current $I_w$. The line voltage U is in phase with the active current $I_w$ and thus, is also shown on the ordinate. In conventional fashion, the current vector I rotates counterclockwise. In the example illustrated, the current lags the voltage by the angle $\phi$. This corresponds to an inductive reactive power with a positive power factor cosine $\phi$.

Figure 2:
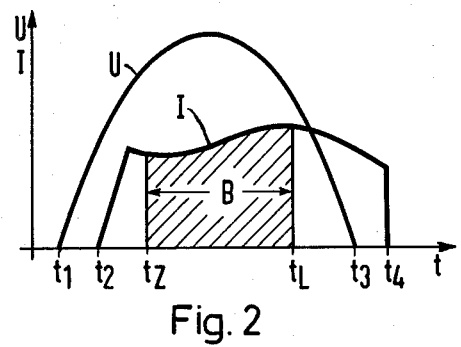
FIG. 2 is a wave-form diagram illustrating current and voltage wave forms during a half cycle.

In FIG. 2 the wave form of the current and voltage supplied to the load during a half cycle is plotted against time T. In a conventional converter circuit, the voltage U passes through zero at the times $t_1$ and $t_3$ with the current I lagging the voltage U and having zero crossings at the times $t_2$ and $t_4$. This again corresponds to a positive power factor and thus to an inductive load. However, if the current is switched on at the time $t_z$ and switched off again at the time $t_L$ a pulse of width B is produced. By suitable choice of the times $t_L$ and $t_z$ within a half cycle the position of the pulse can be selected and the value of the power factor cosine $\phi$ can thereby be adjusted. This control of the pulse can be achieved through the use of a DC control element whose firing time $t_z$ and whose extinguishing time $t_L$ or whose pulse was B are determined by a control unit synchronized with the AC source.

Figure 3:
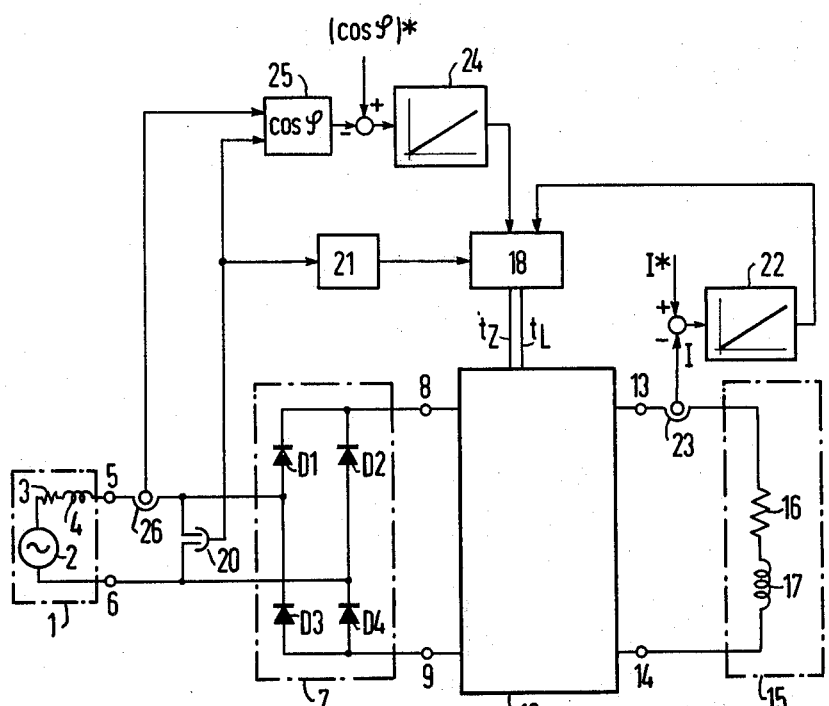
FIG. 3 is a block diagram of a circuit arrangement having the circuit of the present invention therein.

A block diagram of an arrangement of this nature is illustrated on FIG. 3. The AC source 1 comprises a generator having an internal resistance 3 and inductive impedance 4. For purposes of illustration the generator 2 and its resistance and impedance have been illustrated. It will be recognized that the AC source will generally be a voltage taken from the secondary side of a transformer which is connected to an AC system. In such a case the resistance 3 represents the line resistance and the inductance 4 the line inductance. The AC voltage appearing at terminals 5 and 6 is provided to an uncontrolled single-phase rectifier 7 made up of diodes D1, D2, D3 and D4 in a conventional full-wave rectifier bridge circuit. The rectifier 7 has its output terminals coupled to the input terminals 8 and 9 of the DC control element 10. DC control element 10 may be one of the well-known commercially available designs such as those described for example in "Silizium Stromrichter Handbuch" (Silicon Rectifier Handbook) 1971, pages 182–196. The output terminals 13 and 14 of the DC control element 10 are connected to a DC load 15 made up of a resistive portion 16 and inductive portion 17.

A control unit 18 is provided for determining the firing point $t_z$ and the extinguishing point $t_L$ of the associated DC control element 10. In order to synchronize the control unit 18 with the AC voltage the output voltage of the AC source 1 is measured using a voltage transformer 20. A zero crossing detector 21 is used to detect zero cross over of the AC voltage and to provide an output at these times to synchronize the control unit 18. This insures that the firing point and the extinguishing point always occur within a single half cycle. In order to optimize the power factor with respect to the generator 2 it would be necessary to synchronize the control unit 18 directly with the zero crossings of the generator voltage. If the generator voltage is accessible, preferably this voltage will be used for synchronizing purposes. However, if an AC line is used as the AC source, the generator voltage itself generally is not available and thus the output voltage of the AC source 1 will have to be used for synchronizing purposes.

In order to determine the pulse width B a current regulator 22 is provided. Current regulator 22 has as inputs a voltage I proportional to the load current and a voltage I* proportional to a predetermined desired current. The voltage proportional to the actual current I is obtained from a current transformer 23. Controller 22 may be a conventional operational amplifier configured as an integrator which changes its output until it reaches a value where its inputs are equal. The output of the current regulator 22 is provided then as an input to the control unit 18. A second input is provided to the control unit 18 from a power factor control 24 which similarly may be an operational amplifier integrator. At the input summing junction of the controller 24 a predetermined value cosine $\phi$ is summed with a value from a power factor measuring means 25. This power factor measuring means 25 is of conventional design and is provided with the input voltage from the voltage transformer 20 and a voltage proportional to input current from the current transformer 26. In well-known fashion, controller 24 is used to compare these two inputs and change its output until a null is reached at its input summing junction. The control unit 18 having the power factor input from controller 24 and the current input from the controller 22 forms the firing point $t_z$ of the extinguishing point $t_L$ of the DC control element 10 in wellknown fashion.

Figure 5:
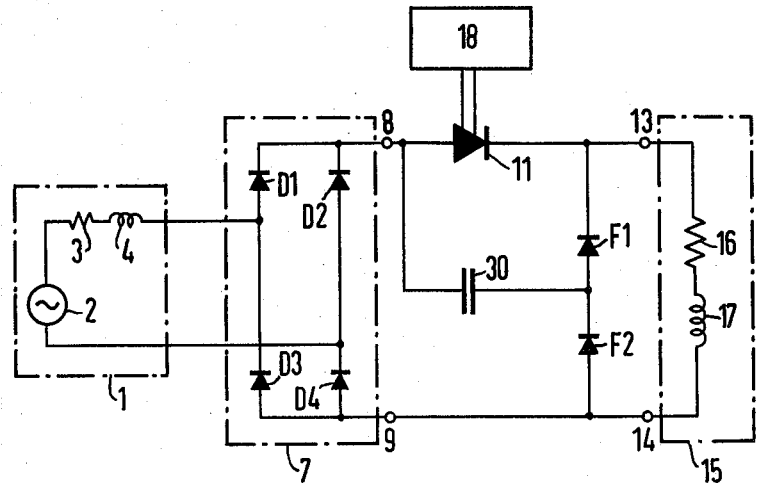
FIG. 5 is a circuit diagram of a first embodiment of a circuit of the present invention.
Figure 6:
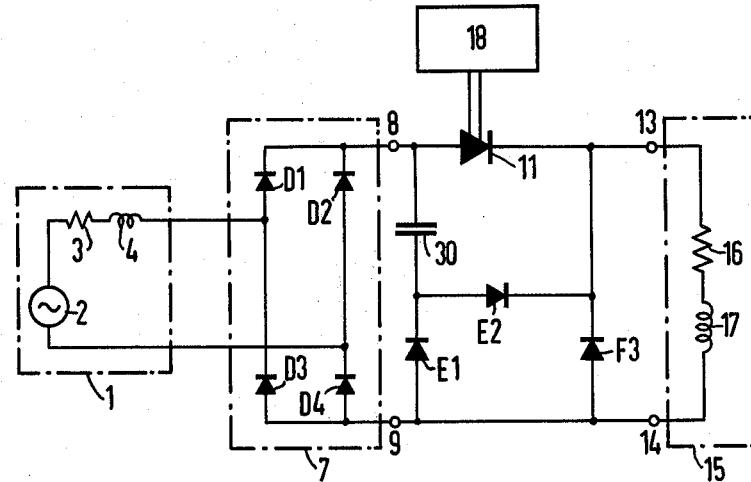
FIG. 6 is a circuit diagram of the circuit of the second embodiment of the present invention.

The specific embodiments of the present invention which provide for reduction of harmonics in the circuit of FIG. 3 are shown on FIGS. 5 and 6. In both of these figures, only the control unit 18 is shown without the control devices providing the current and power factor inputs thereto being shown for the sake of simplicity. All elements identical to those in FIG. 3 are given the same reference numerals and elements the same in both FIGS. 5 and 6 have the same reference numerals. In circuits of both FIGS. 5 and 6 a capacitor 30 associated with the DC control element is provided. In each case it is used for storing the reactive energy of the AC system. The size of the capacitor 30 is selected so that the voltage peak occurring during the extinguishing process does not become excessive. In both examples, the DC load is bridged by by-pass diodes.

The manner in which the circuits operate can best be understood through use of the diagram of FIG. 2. Operation of the circuit of FIG. 5 will first be explained. As long as the controlled rectifier 11 is not fired, no current will flow in the load. As noted above, this rectifier may be of the type well known in the art and described in the Silicon Rectifier Handbook. It is of the type which can be fired and extinguished. If the rectifier 11 is fired and the voltage at the capacitor 30 is higher at that time than the voltage of the AC source 1, the capacitor 30 will discharge through the rectifier 11, the load 15 and the by-pass rectifier F2. As soon as the capacitor voltage falls below the voltage of the AC source the diodes D1 and D4 control the current. [Note that we are discussing here the half cycle of voltage illustrated on FIG. 2 during which cycle D1 and D4 will be conductive]. Thus, in well-known fashion the current will flow through diode D1, the rectifier 11, the load 15 and back through diode D4. When the rectifier 11 is extinguished the inductance 4 of the AC source 1, i.e., the line inductance, forces current to continue to flow through the diode D1, the capacitor 30, the by-pass diode F1, the load 15 and the diode D4 until the line current has decayed and the diodes D1 and D4 are blocked. The reactive energy of the system is thus absorbed by the capacitor 30. In the load circuit, the load inductance 17 forces a current to flow through the two by-pass diodes F1 and F2. By placing the capacitor 30 between an input terminal 8 of the DC control element and the center of the two by-pass diodes F1 and F2 according to the present invention harmonic currents which would normally flow if the capacitor 30 were arranged directly between the input terminals 8 and 9 forming a resonant circuit with the line inductance 4 are prevented.

Operation of FIG. 6 is again better understood with reference to FIG. 2. In this arrangement, the capacitor 30 and a decoupling diode E1 are connected in series between the input terminals 8 and 9 of the DC control element. One electrode of the capacitor 30 is connected with the input terminal 8 of the DC control element, and the other electrode through a further decoupling diode E2 to the output terminal 13 of the DC control element. The DC load 15 is bridged by a by-pass diode F3.

When the control rectifier is fired at time $t_2$ with the voltage at the capacitor 30 higher than the voltage of the AC source 1 the capacitor 30 discharges through the rectifier 11, the load 15 and the decoupling diode E1. As soon as the capacitor voltage falls below the output voltage of the AC source 1, conduction is through the diodes D1 and D4. When the rectifier 11 is extinguished the line inductance 4 of the AC source forces current to continue to flow to diode D1, capacitor 30 decoupling diode E2, load 15 and diode D4 until the current has decayed and the diodes D1 and D4 are blocked. A load inductance 17 causes a current to flow through the by-pass diode F3. The specific arrangement of the capacitor 30 and decoupling diodes E1 and E2 again suppresses the harmonic currents and prevents their reaction with the AC source.

With the circuit of FIG. 6 only one high-capacity by-pass diode F3 is required to take up the full current load. The two decoupling diodes E1 and E2 are stressed to a considerably lesser extent and can accordingly be made smaller. On the other hand, using the circuit of FIG. 5, two high capacity by-pass diodes F1 and F2, each designed for the full load current, are required. Which of the circuits should be used in a particular application can be determined depending on cost and space requirements.

Figure 4:
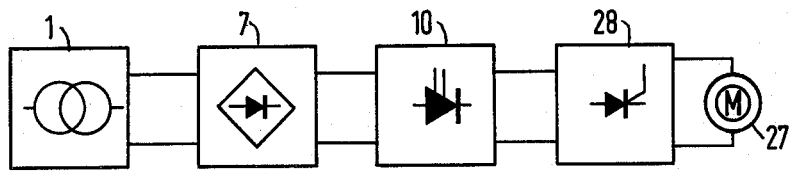
FIG. 4 is a block diagram illustrating the circuit arrangement of the present invention used to supply an electric motor.

FIG. 4 illustrates in block diagram form the application of the circuit of the present invention to supply an electric motor 27. In the manner described above, the DC control element 10 is fed by a rectifier 7 having its input coupled to an AC source 1. An inverter 28 is coupled to the output of the DC control element. The inverter 28 feeds the electric motor 27. As compared to known circuits for feeding an electric motor through an intermediate link converter having an intermediate DC link, the circuits of the present invention has the great advantage that no smoothing members are required in the DC circuit. This makes it possible to eliminate the LC smoothing member between the rectifier and DC control element which would normally be required.

Thus, improved circuits for feeding a DC load from an AC source in which the AC load is coupled to the DC through an uncontrolled rectifier and a DC control element which results in suppression of harmonics has been shown. Although specific embodiments have been illustrated and described, it will be obvious to those skilled in the art that various modifications may be made without departing from the spirit of the invention which is intended to be limited solely by the appended claims.

What is claimed is:

1. In a circuit for supplying a DC load from an AC source through an uncontrolled rectifier and a DC control element arranged between the output of the rectifier and the DC load, the control unit of the DC control element being synchronized with the AC source and arranged to keep the power factor at a predetermined value, a capacitor being associated with the DC control element for storing energy, and a by-pass diode bridged across the DC load, an improved arrangement for suppressing unwanted harmonics comprising:
   a. a first and second by-pass diodes connected in series in the same direction across the load;
   b. a capacitor associated with the DC control element coupled between one input terminal of the DC control element and the center of the two by-pass diodes.

2. The circuit according to claim 1 wherein said uncontrolled rectifier is a single-phase rectifier bridge.

3. The circuit according to claim 1 and further including a current regulator for determining the pulse width of the current supplied to the load, said current regulator having as inputs a value proportional to the load current and a value corresponding to a predetermined desired value of current, the output of said current regulator being provided as an input to the control unit associated with said DC control element.

4. The circuit according to claim 1 and further including a power factor control having as inputs a voltage proportional to the actual power factor of the AC source and a reference value indicative of a desired power factor and having outputs provided to said DC control unit.

5. The circuit arrangement according to claim 1 and further including means for determining the zero crossing of the AC voltage source, said means providing an output to said control unit.

6. The circuit arrangement according to claim 1 wherein said DC load comprises an electric motor fed by an inverter.

7. In a circuit for supplying a DC load from an AC source through an uncontrolled rectifier and a DC control element arranged between the output of the rectifier and the DC load, the control unit of the DC control element being synchronized with the AC source and arranged to keep the power factor at a predetermined value, a capacitor being associated with the DC control element for storing energy, and a by-pass diode bridged across the DC load, an improved arrangement for suppressing unwanted harmonics comprising: the capacitor associated with the DC control element and a first decoupling diode connected in series between the input terminals of the DC control element, one electrode of the capacitor connected with one input terminal of DC control element and a second decoupling diode coupling the other electrode of the capacitor with an output terminal of said DC control element.

8. The circuit according to claim 7 wherein said uncontrolled rectifier is a single-phase rectifier bridge.

9. The circuit according to claim 7 and further including a current regulator for determining the pulse width of the current supplied to the load, said current regulator having as inputs a value proportional to the load current and a value corresponding to a predetermined desired value of current, the output of said current regulator being provided as an input to the control unit associated with said DC control element.

10. The circuit according to claim 7 and further including a power factor control having as inputs a voltage proportional to the actual power factor of the AC source and a reference value indicative of a desired power factor and having outputs provided to said DC control unit.

11. The circuit arrangement according to claim 7 and further including means for determining the zero crossing of the AC voltage source, said means providing an output to said control unit.

12. The circuit arrangement according to claim 7 wherein said DC load comprises an electric motor fed by an inverter.

* * * * *